July 16, 1940.　　　L. MASLOW　　　2,208,337
WHIP
Filed March 28, 1940
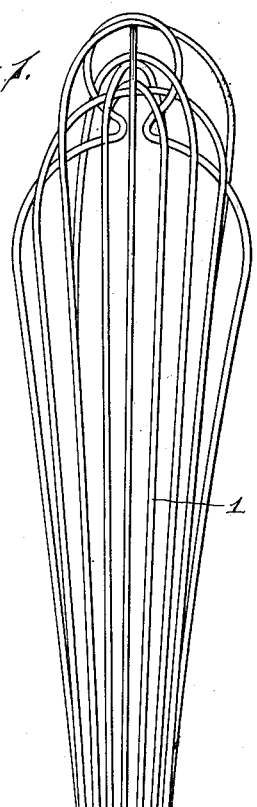
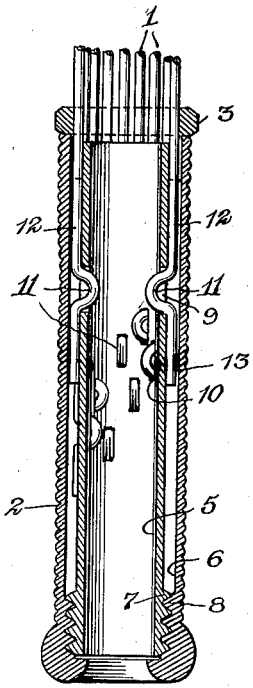
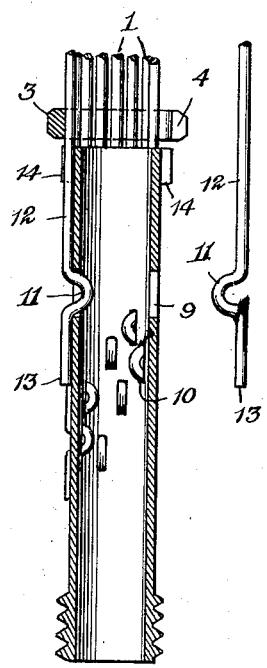
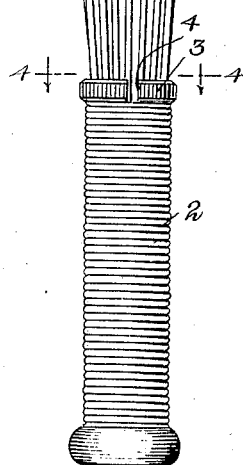
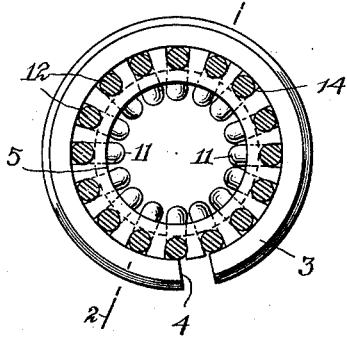
WITNESSES
INVENTOR
Louis Maslow
BY
Munn, Anderson & Liddy
ATTORNEYS Patented July 16, 1940

2,208,337

UNITED STATES PATENT OFFICE 2,208,337

WHIP

Louis Maslow, Brooklyn, N. Y.

Application March 28, 1940, Serial No. 326,353

5 Claims. (Cl. 259—144)

This invention relates to an improved whip or beater for beating eggs or other articles, an object being to provide a construction which is durable and which presents a plurality of looped members formed of wire or other material arranged to secure an efficient beating action with a minimum effort.

A further object of the invention is to provide a whip having looped wires connected to a handle, the structure being such that any one loop may be removed without disturbing the remaining loops.

Another object of the invention is to provide a whip having looped wires interlocking with a base handle member provided with a grip portion and the parts arranged so that they will normally remain in functioning position but may be readily disassembled for cleaning or for removal of any or all the loop members.

An additional object of the invention is to provide a simple whip structure having a handle and a plurality of loops, with the handle formed open at both ends whereby cleaning fluid may be forced therethrough at any desired time for cleaning the handle structure and loops adjacent thereto.

In the accompanying drawing—

Fig. 1 shows a whip disclosing an embodiment of the invention;

Fig. 2 is a sectional view on a reduced scale through Fig. 4 approximately on the line 2—2;

Fig. 3 is a view similar to Fig. 2 but with the grip or casing removed and one end of one of the loops sprung outwardly or disengaged from the base;

Fig. 4 is a sectional view through Fig. 1 approximately on the line 4—4, the same being on an appreciably large scale.

Referring to the accompanying drawing, 1 indicates a plurality of loops similar to the loop shown in my prior Patent No. 1,910,302. These loops are preferably formed of strong resilient wire and are maintained spaced apart so as to give a good whipping action when the device is in use. The respective ends of each of the loops are anchored in a handle 2. This handle may be disengaged from the loops and yet the loops held in their assembled position by a retaining spring 3, which is slightly resilient and which is provided with an opening 4 sufficiently large to allow the end portion of any one of the loops to pass, as indicated in Fig. 3. The handle 2 is formed with a tubular base 5 and a casing 6 screwed thereon. It will be noted that the base 5 is provided with an exteriorly threaded section 7 and the casing 6 is provided with an interiorly threaded section 8. When these sections are secured together, as shown in Fig. 2, the parts in their fully functioning position.

The base 5 is provided with four spiral rows of slots 9 and 10. The various slots are spaced apart and also the rows are slightly spaced apart so that the slots may be of a desired size to receive the offset bent portion 11 of each of the loops while maintaining the diameter of the base 5 sufficiently small to provide a desired size handle after the grip or casing 6 has been placed in position. Each of the loops is provided at each end with a straight section 12 and this straight section, near the end 13 thereof, is provided with an offset loop 11, which is adapted to extend through one of the apertures 9 and 10. The base 5 is also provided with a slotted ring 14, as indicated particularly in Fig. 3, and the straight sections 13 of the respective loops fit into slots in this ring and the looped offset 11 fits in slots 9 and 10 which may be aligned therewith. If desired, instead of having a bowed offset 11, the extreme end of each loop could be bent so as to extend to the slots though the arrangement shown in Fig. 3 is preferable.

After the loops 11 of the various members have been fitted in the various slots 9 and 10, the case 6 is slid over the removable parts until the threaded portion 8 engages the threaded portion 7, whereupon the casing is rotated until the parts are in the position shown in Fig. 2. Ring 14 remains in place and forms an ornamental end for the casing or grip 6. When the casing or grip is removed, ring 14 then functions to hold the various loop members in their assembled relation but may be readily rotated to remove any loop member desired while holding the other loop members in their assembled position.

It will be readily observed that the casing may be removed at any time for replacing any of the loop members or for permitting cleaning of all the parts. This may be done by applying clean water or other solution, or the parts may be merely placed beneath a hot water faucet and the water allowed to forcibly clean the respective parts. Also the parts being hollow and open at both ends, hot water, or water at any temperature, may be forced through the handle 2 for cleaning purposes.

I claim:

1. A whip of the character described including a plurality of looped members formed adjacent their ends with substantially half-circular looped offset portions, a tubular base having a plurality of slots extending longitudinally of the base positioned to receive the offset portions of said looped members, an exteriorly positioned threaded enlargement at one end, and a hollow casing fitting over said tubular base and snugly fitting over the ends of said looped members carrying said offset portions for holding the offset portions in said slots, said casing having an inwardly extending annular portion at one end provided with threads and adapted to be screwed over said threaded enlargement on said base for locking said casing in position.

2. A whip including a plurality of looped wires having at their ends straight sections, each straight section having an offset loop, a tubular base having a plurality of spirally arranged slots, and a slotted ring at one end, each of said straight sections fitting into one of the slots of said slotted ring with its offset loop fitting into a slot in said base in alignment with the slot in the slotted ring, a ring divided at one point fitting over all of said straight sections for normally holding them in functioning position in respect to said base, and a casing fitting over said base and said straight sections for maintaining said straight sections in functioning position and also presenting a grip whereby the device may be manipulated.

3. A whip of the character described including a plurality of looped members formed adjacent their ends with offset portions, a tubular base having a plurality of slots positioned to receive the offset portions of said looped members and exteriorly positioned threads at one end, a hollow casing fitting over said tubular base and snugly fitting over the ends of said looped members carrying said offset portions for holding said offset portions in said slots, said casing having interiorly positioned threads at one end adapted to be screwed over the exterior threads on said base for locking said casing in position, and a rotatably mounted ring open at one point sufficiently to permit one of said looped members to pass therethrough, said ring being positioned near the end of said tubular body and functioning to hold said looped members in substantially normal position when said casing is removed.

4. A whip of the character described including a plurality of looped wires having near their ends arc-shaped offset portions, a handle for said looped wires, said handle including a tubular body having slots extending longitudinally of the handle for receiving said arc-shaped offset portions and spaced radially extending teeth at one end providing a notch for each leg of each of said looped wires for holding the legs properly spaced, and a tubular casing fitting over said body, said arc-shaped offset portions and said teeth for locking said arc-shaped offset portions in interlocked relation with said tubular body and the legs of said looped wires in said notches.

5. A whip as set forth in claim 4, characterized by a rotatable ring open at one point sufficiently to permit one of said legs to pass therethrough, said ring being positioned around said looped members adjacent the end of said casing for holding said looped members substantially in their normal position when said casing has been removed.

LOUIS MASLOW.